United States Patent Office 2,731,039
Patented Jan. 17, 1956

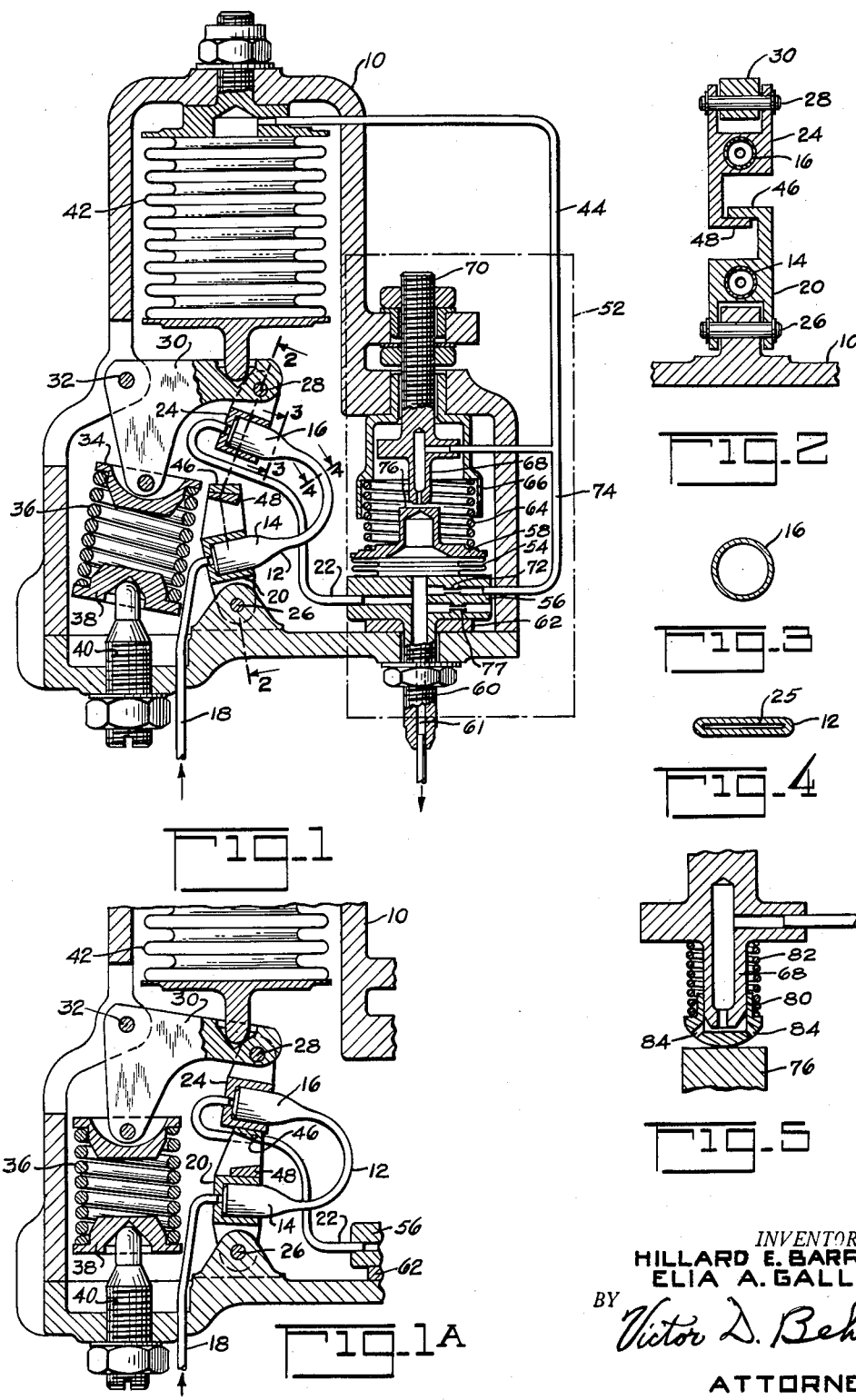

2,731,039

FLUID PRESSURE REGULATOR

Hillard E. Barrett, East Orange, and Elia A. Gallo, Englewood, N. J., assignors to Curtiss-Wright Corporation, a corporation of Delaware Application March 11, 1952, Serial No. 276,016

8 Claims. (Cl. 138—45)

This invention relates to fluid pressure regulators and is particularly directed to a fluid pressure regulator in which fluid pressure regulation is obtained by bending or flexing of a bent flattened tube serially connected in the fluid pressure line.

It is known that the fluid flow resistance through a bent flat tube varies as the tube is flexed. An object of the present invention comprises the provision of a novel and compact fluid pressure regulator utilizing a bent flat tube as the variable fluid flow resistance regulating the fluid pressure.

Other objects of the invention will become apparent upon reading the annexed detailed description in connection with the drawing in which:

Fig. 1 is a sectional view through a regulator embodying the invention with said variable fluid flow resistor tube in its minimum bent condition;

Fig. 1A is a partial view similar to Fig. 1 but illustrating said variable flow resistor tube in its maximum bent condition;

Fig. 2 is a sectional view taken along line 2—2 of Fig. 1;

Figs. 3 and 4 are enlarged sectional views taken along lines 3—3 and 4—4 of Fig. 1; and Fig. 5 is a sectional view illustrating a modified nozzle construction.

The invention has been designed for use as a fluid pressure regulator providing a source of fluid at constant pressure. Such a constant pressure fluid source is required in many pneumatic and hydraulic control systems for example in a system such as disclosed in copending application Serial No. 253,878, filed October 30, 1951. For this purpose the invention has been designed to provide a constant output fluid pressure of 17 p. s. i. (pounds per square inch) from an inlet pressure varying between 400 and 2000 p. s. i.

Referring to the drawing, the fluid pressure regulator is supported within a housing 10 and comprises an open-ended tube 12 having an arcuate bend intermediate its ends. As illustrated, the tube 12 has a substantially U-shape and said tube is supported for flexing or bending movement of the tube so that the tube ends 14 and 16 are movable toward and away from each other. A fluid inlet passageway 18 is connected to one end 14 of the tube 12 through a fluid pressure fitting 20 and a fluid outlet passageway 22 is connected to the other end 16 of said tube by a fluid pressure fitting 24.

The ends 14 and 16 of the tube 12 have a circular cross-section (Fig. 3) while the arcuate intermediate portion of said tube has a flattened cross-section thereby providing a flattened passageway 25 therethrough (Fig. 4). The width of the flat passageway 25 has been greatly exaggerated in Fig. 4 to permit illustration of said passageway. For example, a tube originally having a one-quarter inch internal diameter was flattened, by a rolling operation, so that in its free condition the width of the flat passage 25 was of the order of 0.0005 inch. With the tube 12 flattened to this extent there is a substantial percentage change in the cross-sectional area of the flat flow passage 25 when the tube is bent or flexed by movement of its ends 14 and 16 toward and away from each other. Thus the tube 12 constitutes a variable fluid flow resistor between the inlet and outlet passageways 18 and 22.

The tube fitting 20 is pivotally supported within the housing at 26 and the tube fitting 24 is pivotally connected at 28 to one end of a bell crank or L-shaped lever 30. The lever 30 is pivotally supported in the housing intermediate its ends at 32. The other end of the L-shaped lever 30 is pivotally connected to a plate 34 against which a compression spring 36 acts. The spring 36 is disposed between the plate 34 and a plate 38, said latter plate bearing against a screw 40 for adjusting the compression of the spring 36.

A bellows-type flexible diaphragm 42 also engages the lever 30 at one end and the other end of said bellows is anchored to the housing 10. A passageway 44 supplies a fluid under a controlled pressure into the bellows 42, the fluid pressure force of the bellows 42 acting on the lever 30 in opposition to the spring 36 whereby the bellows 42 provides the force for opening and closing the tube 12 to vary its fluid flow resistance.

As best seen in Fig. 2 the tube fitting 20 has an L-shaped extension 46 cooperating with a correspondingly shaped extension 48 of the fitting 24 such that said extensions function as stops limiting the extent to which the tube end 16 can be moved toward and away from the other tube end 14. The extensions or stops 46 and 48 thus prevent excessive bending or flexing of the tube 12 by the lever 30. The tube 12 is formed so that in its free condition the tube end 16 is positioned approximately midway between the limits of its movement as provided by the extensions or stops 46 and 48. Therefore the maximum stress occurring in the tube 12, when the tube end 16 is bent to either of its limiting positions, is substantially less than the corresponding stress which would occur if, in its free condition, the tube end 16 were disposed against one of the stops 46 or 48. It should also be noted that because the ends 14 and 16 are pivotally supported, the maximum bending moment on the tube 12 always occurs in the flat intermediate portion of said tube whereby the change in the cross-sectional area and fluid flow resistance of this flat tube portion, for a given deflection of the tube end 16, is greater than what said change would be if, for example, the tube end 14 were rigidly secured to the housing 10.

With the construction so far described, the fluid flow resistance of the tube 12 increases with movement of its ends 14 and 16 toward each other and decreases with movement of said ends away from each other. Thus opening or closing of the passage 25 of tube 12 by bending of the tube ends 14 and 16 away from or toward each other varies the fluid pressure drop across said tube produced by the fluid flowing therethrough from the inlet passageway 18 to the outlet passageway 22. The fluid pressure in the bellows 42 is automatically controlled to effect opening or closing adjustments of the passage 25 so as to maintain a constant pressure in the outlet passage 22. For this purpose a control mechanism 52 is provided.

The control mechanism 52 comprises a flexible bellows-type diaphragm 54 having end plates 56 and 58. The end plate 56 has a threaded stem 60 for securing said plate to the housing, a shim 62 being disposed between the plate 56 and housing 10 for properly positioning the bellows 54. The outlet passageway 22 communicates, through the plate 56, with the interior of the bellows 54 and with the hollow interior 61 of the stem 60, said stem providing the outlet port connection of the regulator. A spring 64 acts against the end plate 58 of the bellows 54 in opposition to the fluid pressure within said bellows, said spring 64 being disposed between the bellows end plate 58 and a member 66 carried by the housing 10. A nozzle member 68 has a threaded stem 70 adjustably secured to the housing 10. The inner end of the nozzle member has a restricted discharge opening through which fluid from the outlet passage 22 bleeds via a restriction 72 and a passage 74. The passage 74 also communicates with the passage 44 leading to the bellows 42. The central portion 76 of the bellows end plate 58 overlies the open discharge end of the nozzle 68 to act as a fluid baffle therefor. A restricted vent passageway 77 communicating with the outlet passageway 22 may also be provided to prevent the build up of excessive pressure in the bellows 42 in the event flow through the outlet port 61 should be prevented for any reason.

With this construction of the fluid pressure regulator and its control mechanism, the fluid pressure in the outlet passageway 22 will be maintained substantially constant at a predetermined value determined by the setting of said control mechanism 52. If the outlet pressure exceeds said predetermined value, the bellows 54 will expand slightly to effect a closing adjustment of the nozzle 68. This closing nozzle adjustment decreases the leakage or bleed flow from the outlet passageway 22 through the restriction 72, the passage 74 and nozzle 68 thereby increasing the pressure in the passage 44 and in the power bellows 42. As a result of this increase in the pressure within the power bellows 42, said bellows moves the lever 30 against the spring 36 to effect a closing adjustment of the passage 25 of the tube 12 thereby increasing the fluid pressure drop across said tube passage and effecting a corresponding decrease in the outlet pressure. Likewise, if the outlet pressure decreases below said predetermined value, the bellows 54 is contracted slightly by the spring 64 thereby effecting an opening adjustment of the nozzle 68. This opening nozzle adjustment increases the leakage flow through the restriction 72 and nozzle 68 thereby decreasing the pressure in the passage 44 and in the power bellows 42. As a result, the spring 36 moves the lever 30 against bellows 42 to effect an opening adjustment of the passage 25 of the tube 12 thereby decreasing the fluid pressure drop across said tube passage and effecting a corresponding increase in the outlet pressure.

The actual range of movement of the bellows end plate 58 between full open and full closed positions of the nozzle 68 is very small so that the force of the spring 64 against the bellows 54 is substantially constant. Therefore, since the regulator always stabilizes with its outlet pressure balancing this substantially constant spring force, said outlet pressure also is substantially constant. The magnitude of the outlet pressure maintained depends on the force exerted by the control mechanism spring 64. This spring force can be changed by substitution of a spring 64 of different stiffness or by adjustably anchoring the one end of said spring to the housing. As illustrated, however, the nozzle 68 is adjustably mounted in the housing 10 for setting the spring force and therefore the outlet pressure. For example, if the nozzle 68 is raised from its position in the drawing, this opens the nozzle to decrease the pressure in the passage 44 and in the power bellows 42 thereby effecting an opening adjustment of the tube 12 to increase the outlet pressure. Then, provided the bellows 54 has a sufficient range of movement, the outlet pressure will increase until it is sufficient to raise the bellows plate 58 against the spring until the baffle portion 76 of said plate is again within the throttling range of the nozzle 68. In other words the position of the nozzle 68 determines the position of the baffle portion 76 of the plate 58 against which the spring 64 bears whereby the force of said spring can be adjusted by adjusting the position of the plate 58 in response to adjustment of the position of the nozzle 68. In an actual design, the range of movement of the bellows 54 was quite small so that in order, for example, to increase the pressure setting of the spring 64 it not only was necessary to raise the nozzle 68 to a higher position (as viewed in the drawing) but it was also necessary to place a larger shim 62 under the bellows 54 so as to raise its baffle portion 76 against the spring 64 to within the throttling range of said nozzle.

As the lever 30 moves to close the tube 12 in response to an increase in the fluid pressure force of the bellows 42, the moment arm of the force of the spring 36 on the lever decreases to such an extent that in the extreme closed position of said tube the line of action of the force of the spring 36 passes through the lever pivot 32 whereupon the moment arm of said spring force is zero. Thus the moment arm of the force of the spring 36 on the lever 30 is a maximum when the tube 12 is opened to its maximum extent and said moment arm is a minimum when said tube opens to its minimum extent. This variation in the moment arm of the force of the spring 36 on the lever 30 results from the bell crank shape of said lever whereby, in all positions of said lever, the distance between the point of application of the force of the spring 36 on the lever 30 and the pivot axis of said lever is substantially greater than the moment arm of said force. Because of this decrease in the moment arm of the force of the spring 36 on the lever 30 with closing adjustment of the tube 12 it is possible to use a reasonable size bellows 42 in conjunction with a fluid pressure bled off from the output fluid of the regulator such that the range and magnitude of the fluid pressure force of the bellows 42 is sufficient to move the tube 12 between its extreme positions. This is so because when the tube 12 is in its maximum open position the turning moment exerted by the tube end 16 (by virtue of the elasticity of said tube) on the lever 30 in opposition to the turning moment exerted by the fluid pressure in the bellows 42 on said lever is a minimum. In fact with the tube 12 formed so that in its free condition the tube end 16 is positioned approximately midway between the limits of its movement, the turning moment exerted by the tube 12 on the lever 30 when the tube is in its maximum open position actually is in the same direction as said fluid pressure turning moment. The bellows 42 by virtue of the elasticity of its walls also exerts a small turning force on the lever 30. The spring 36 provides the opposing and balancing turning moment against the lever 30. In the other extreme or bent position of the tube 12, the tube end 16 exerts a relatively large turning moment on the lever 30 in opposition to the fluid pressure in the bellows 42. Hence the turning moment of the fluid pressure force of the bellows 42 on the lever must now be equal to the sum of the turning moments exerted by the spring 36 and by the tube end 16 on the lever 30, neglecting for simplicity the small force on said lever of the bellows 42 by virtue of its elasticity. With the present invention the moment arm of force of the spring 36 on the lever 30 decreases as the tube 12 is bent toward its extreme bent position and therefore, for a given range of fluid pressures for the bellows 42, a bellows 42 of substantially small cross-sectional area can be used to bend the tube 12 to its extreme bent position than would be required if the moment arm of the force of the spring 36 were constant.

The discharge end of the nozzle 68 should remain perpendicular to its baffle member since tilting of said baffle member would alter the nozzle flow resistance. In order to insure that the discharge end of the nozzle 68 is always directed at right angles to its baffle member, the construction of Fig. 5 may be used. As illustrated in Fig. 5, a cup-shaped sleeve 80 is slidably fitted over the discharge end of the nozzle 68, said sleeve having an arcuate outer end which is held against the central portion 76 of the bellows plate 58 by a light spring 82. The sleeve 80 has vent holes 84 in its end for the escape of the fluid discharging from the nozzle. With this construction of Fig. 5, the flat inner bottom surface of the sleeve member 80 acts as the baffle for the nozzle 68 and the fit between said sleeve and nozzle maintains said surface perpendicular to the nozzle axis.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A fluid pressure regulator comprising an inlet passageway; an outlet passageway; an open-ended tube serially connected between said passageways, said tube having an arcuate bend intermediate its ends with said arcuate portion being elastically bendable and having a substantially flat cross-section such that the fluid flow resistance of said tube respectively increases and decreases with movement of the tube ends toward and away from each other; first means including a spring operatively connected to said tube between the tube ends for applying a force urging said tube ends relative to each other; and second means operatively connected to said tube between the tube ends for applying a control force in opposition to said spring force, the connection of one of said first and second means to said tube being such that the effectiveness of its force on said tube varies so as to reduce the maximum control force required.

2. A fluid pressure regulator comprising an inlet passageway; an outlet passageway; an open-ended tube serially connected between said passageways, said tube having an arcuate bend intermediate its ends with said arcuate portion being elastically bendable and having a substantially flat cross-section such that the fluid flow resistance of said tube respectively increases and decreases with movement of the tube ends toward and away from each other; a spring pivotally connected to one end of said tube for moving said one tube end toward and away from the other tube end; a fixed support; means pivotally connecting the other end of said tube to said fixed support; means limiting the range of movement of said one tube end toward and away from the other tube end such that in the free condition of said tube said one tube end is disposed approximately mid-way between said limits of its range of movement; and means operatively connected to said tube for applying a control force in opposition to said spring force.

3. A fluid pressure regulator comprising an inlet passageway; an outlet passageway; an open-ended tube serially connected between said passageways, said tube having an arcuate bend intermediate its ends with said arcuate portion being elastically bendable and having a substantially flat cross-section such that the fluid flow resistance of said tube respectively increases and decreases with movement of the tube ends toward and away from each other; a lever connected to one end of said said tube; a support member connected to the other end of said tube; first means including a spring operatively connected to said lever for urging said lever in one direction to move said one tube end in one direction relative to the other tube end; and second means operatively connected to said lever for applying a control force against said lever in opposition to said spring force, the connection of one of said first and second means to said lever being such as to vary the effective moment arm of the force of one of said means on said lever so as to reduce the maximum control force required.

4. A fluid pressure regulator having a fluid inlet and a fluid outlet, said regulator comprising an open-ended tube serially connected between said inlet and outlet, said tube having an arcuate bend intermediate its ends with said arcuate portion being elastically bendable and having a substantially flat cross-section such that the fluid flow resistance of said tube respectively increases and decreases with movement of the tube ends toward and away from each other; a support member connected to one end of said tube; a lever connected to the other end of said tube such that pivotal movement of said lever in one direction moves the ends of said tube away from each other and pivotal movement of said lever in the opposite direction moves the ends of said tube toward each other; means for limiting the range of movement of said lever and the tube end connected to said lever; a spring operatively connected to said lever for urging said lever in said one direction such that the moment arm of the force of said spring on said lever is a maximum when said lever has moved to its limiting position in which the spacing of said tube ends is a maximum and said moment arm is a minimum when said lever has moved to its other limiting position; and fluid pressure means operatively connected to said lever for applying a control force to said lever in opposition to said spring force.

5. A fluid pressure regulator comprising an inlet passageway; an outlet passageway; an open-ended tube serially connected between said passageways, said tube having an arcuate bend intermediate its ends with said arcuate portion being elastically bendable and having a substantially flat cross-section such that the fluid flow resistance of said tube respectively increases and decreases with movement of the tube ends toward and away from each other; a fixed structure; means pivotally connecting one end of said tube to said fixed support; a bell crank lever pivotally mounted on said structure and having one end pivotally connected to the other end of said tube such that pivotal movement of said lever in one direction moves the ends of said tube away from each other and pivotal movement of said lever in the opposite direction moves the ends of said tube toward each other; a spring operatively connected to the other end of said lever for urging said lever in said one direction such that movement of said lever in said one direction results in an increase in the moment arm of the force exerted by said spring on said lever; and fluid pressure means operatively connected to said lever for urging said lever in said opposite direction; and means for applying a control force to said lever in opposition to said spring force.

6. A fluid pressure regulator comprising an inlet passageway; an outlet passageway; an open-ended tube serially connected between said passageways, said tube having an arcuate bend intermediate its ends with said arcuate portion being elastically bendable and having a substantially flat cross-section such that the fluid flow resistance of said tube respectively increases and decreases with movement of the tube ends toward and away from each other; a lever connected to one end of said tube for moving said one tube end toward and away from the other tube end; a support member connected to the other end of said tube means limiting the range of movement of said one tube end toward and away from the other tube end such that in the free condition of said tube said one tube end is disposed approximately mid-way between said limits of its range of movement; a spring operatively connected to said lever for urging said lever in a direction to move said one tube end away from the other tube end, said spring-lever connection being such that the effective moment arm of the force of said spring on said lever decreases upon pivotal movement of said lever against said spring force; and means operatively connected to said lever for applying a control force against said lever opposing said spring force.

7. A fluid pressure regulator comprising an inlet passageway; an outlet passageway; an open-ended tube serially connected between said passageways, said tube having an arcuate bend intermediate its ends with said arcuate portion being elastically bendable and having a substantially flat cross-section such that the fluid flow resistance of said tube respectively increases and decreases with movement of the tube ends toward and away from each other; a lever connected to one end of said tube for moving said one tube end toward and away from the other tube end; a support member connected to the other end of said tube; means limiting the range of movement of said one tube end toward and away from the other tube end such that in the free condition of said tube said one tube end is disposed approximately mid-way between said limits of its range of movement; a spring operatively connected to said lever for urging said lever in a direction to move said one tube end away from the other tube end, said spring-lever connection being such that the moment arm of the force of said spring on said lever is a maximum when said lever has moved said one tube end to its limiting position in which the spacing between said tube ends is a maximum and said moment arm is substantially zero when said lever has moved said one tube end to its other limiting position; and fluid pressure means operatively connected to said lever for applying a control force to said lever opposing said spring force.

8. A fluid pressure regulator comprising an inlet passageway; an outlet passageway; an open-ended tube serially connected between said passageways, said tube having an arcuate bend intermediate its ends with said arcuate portion being elastically bendable and having a substantially flat cross-section such that the fluid flow resistance of said tube respectively increases and decreases with movement of the tube ends toward and away from each other; a lever pivotally connected to one end of said tube for moving said one tube end toward and away from the other tube end; a fixed support means pivotally connecting said lever to said fixed support; means pivotally connecting the other end of said tube to said fixed support; means limiting the range of movement of said one tube end toward and away from the other tube end such that in the free condition of said tube said one tube end is disposed approximately midway between said limits of its range of movement; a spring operatively connected to said lever for urging said lever in a direction to move said one tube end away from the other tube end, said spring-lever connection being such that the moment arm of the force of said spring on said lever is a maximum when said lever has moved said one tube end to its limiting position in which the spacing between said tube ends is a maximum and said moment arm is substantially zero when said lever has moved said one tube end to its other limiting position; and fluid pressure means operatively connected to said lever for applying a control force to said lever opposing said spring force.

References Cited in the file of this patent

UNITED STATES PATENTS

| | | |
|---|---|---|
| 2,241,636 | Eliason | May 13, 1941 |
| 2,274,678 | Eliason | Mar. 3, 1942 |
| 2,278,952 | Soderberg | Apr. 7, 1942 |
| 2,371,218 | Boynton | Mar. 13, 1945 |
| 2,432,082 | Bilyeu | Dec. 9, 1947 |
| 2,590,396 | Garretson | Mar. 25, 1952 |
| 2,618,294 | Neuman | Nov. 18, 1952 |